(12) United States Patent
Fontaine

(10) Patent No.: US 6,691,423 B2
(45) Date of Patent: Feb. 17, 2004

(54) MITER GAUGE

(75) Inventor: Norston Fontaine, Minneapolis, MN (US)

(73) Assignee: Bench Dog, Inc., Minneapolis, MN (US)

( * ) Notice: Subject to any disclaimer, the term of this patent is extended or adjusted under 35 U.S.C. 154(b) by 0 days.

(21) Appl. No.: 10/175,112

(22) Filed: Jun. 19, 2002

(65) Prior Publication Data

US 2002/0189121 A1 Dec. 19, 2002

Related U.S. Application Data

(60) Provisional application No. 60/299,246, filed on Jun. 19, 2001.

(51) Int. Cl.$^7$ .............................................. G01D 23/00
(52) U.S. Cl. .................. 33/640; 33/471; 83/435.13; 83/435.14
(58) Field of Search .................. 33/640, 628, 626, 33/374, 465, 471, 630, 641, 642; 83/435.12, 435.13, 435.14, 477.2

(56) References Cited

U.S. PATENT DOCUMENTS

| | | | | |
|---|---|---|---|---|
| 3,604,482 A | * | 9/1971 | Warrick et al. | ................ 83/473 |
| 4,514,909 A | * | 5/1985 | Gilbert | ......................... 33/471 |
| 4,741,387 A | * | 5/1988 | Strong | ......................... 83/421 |
| 4,901,444 A | * | 2/1990 | Maschmeier | .................. 33/423 |
| 5,038,486 A | | 8/1991 | Ducate, Sr. | |
| 5,097,601 A | | 3/1992 | Pollak et al. | |
| 5,379,669 A | | 1/1995 | Roedig | |
| 5,402,701 A | | 4/1995 | Ingram | |
| 5,473,821 A | * | 12/1995 | DiMarco | ...................... 33/456 |
| 5,845,410 A | * | 12/1998 | Boker | .......................... 33/536 |
| 6,256,900 B1 | | 7/2001 | Myers | |
| 6,431,042 B1 | * | 8/2002 | Brault et al. | ................ 83/471.3 |
| 6,502,492 B1 | * | 1/2003 | Krohmer et al. | ......... 83/435.13 |
| 6,513,412 B2 | * | 2/2003 | Young | ........................ 83/471.3 |
| 6,584,698 B1 | * | 7/2003 | Liu | ............................... 33/640 |

* cited by examiner

*Primary Examiner*—Christopher W. Fulton
*Assistant Examiner*—Amy R Cohen
(74) *Attorney, Agent, or Firm*—Crompton, Seager & Tufte LLC

(57) ABSTRACT

A miter gauge apparatus for use on a work surface having an alignment track is disclosed. The miter gauge apparatus may include a guide bar adapted to slidably fit within an alignment track, a miter housing secured to the guide bar, a fence mount configured to rotate about the entire periphery of the miter housing, and an expandable fence. The miter housing may include a disc assembly comprising an upper plate, a lower plate, and a slot therebetween. A cam post slidably disposed within the slot can be configured to fit within a cam post aperture disposed on the fence mount. A cam pin disposed within the fence mount can be engaged within an opening on the cam post to releasably secure the fence mount to the miter housing.

34 Claims, 11 Drawing Sheets

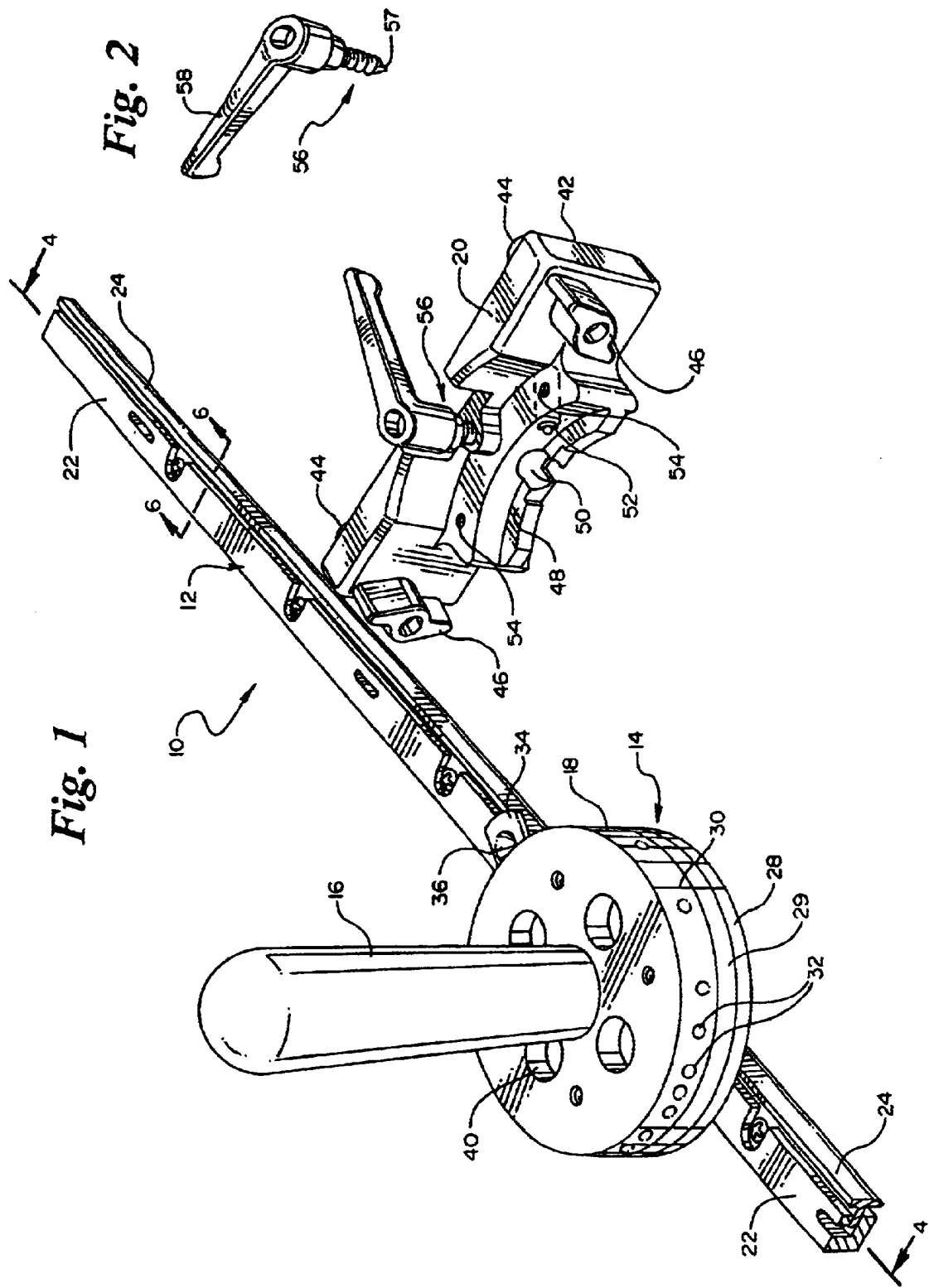

Fig. 8

| Fig. 8A | Fig. 8B |
|---|---|

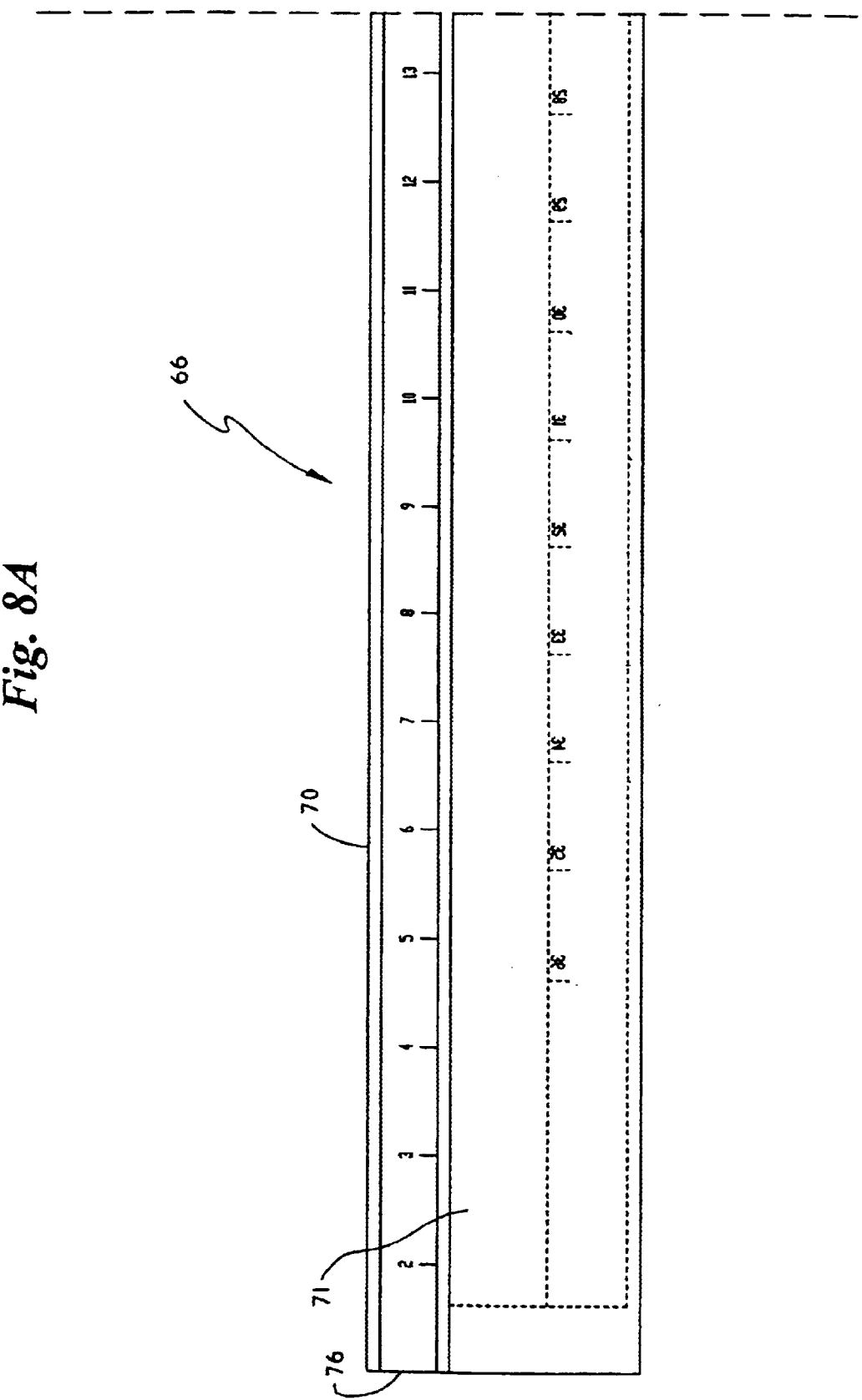

MITER GAUGE

CROSS REFERENCE TO RELATED APPLICATION

The present application claims the benefit of U.S. Provisional Application Ser. No. 60/299,246, filed on Jun. 19, 2001.

FIELD OF THE INVENTION

The present invention relates generally to the field of machines and tools for cutting and shaping wood. More particularly, the present invention relates to miter gauges for use with work surfaces such as table saws or router tables.

BACKGROUND OF THE INVENTION

Miter gauges are frequently utilized to cut materials such as wood and metal at various angles relative to a blade. Examples of power tools employing miter gauges include table saws, jig saws, radial arm saws, band saws and routers. With a table saw, for example, a workpiece may be placed against the miter gauge, and then advanced toward the saw blade to be cut or shaped. An instrument such as a dial or scale can be used to set the workpiece at various angles relative to the blade.

To permit the miter gauge and attached workpiece to freely slide along the work surface, many conventional miter gauges include a guide bar configured to slide within an alignment track. Such alignment tracks are typically recessed within the work surface along a line either parallel or perpendicular to the blade. In use, the miter gauge is adapted to hold the workpiece in position as it passes through the blade.

SUMMARY OF THE INVENTION

The present invention relates generally to the field of machines and tools for cutting and shaping wood. A miter gauge in accordance with an exemplary embodiment of the present invention includes a guide bar, a miter housing, a fence mount, and a fence. The guide bar may include adjustment means to adjust the width of the guide bar to fit within an alignment track formed on a work surface such as a table saw or router table. In certain implementations, for example, the guide bar may include a T-shaped track and a U-shaped track. The T-shaped track can be configured to move relative to the U-shape track to allow the operator to adjust the width of the guide bar, if desired.

The miter housing may include a disc assembly having an upper plate, a lower plate, and a slot therebetween. A cam post slidably disposed within the slot can be configured to fit within a cam post aperture on the fence mount. To releasably secure the fence mount to the miter housing, a cam pin extendable through the cam post aperture can be engaged within the cam post. In some implementations, the fence mount and miter housing can be configured to permit full rotation of the fence mount about the miter housing.

In some embodiments, the miter gauge may further include an expandable fence. The expandable fence can include a main section, a carriage, and a fence extender. In use, the expandable fence can be adjusted to accommodate for various sized workpieces. A flip stop mechanism can also be utilized to prevent movement of the workpiece in a direction substantially parallel the length of the fence.

BRIEF DESCRIPTION OF THE DRAWINGS

FIG. 1 is a partial exploded, perspective view of a miter gauge in accordance with an exemplary embodiment of the present invention;

FIG. 2 is an exploded view of the cam pin illustrated in FIG. 1;

DETAILED DESCRIPTION OF THE INVENTION

Figure 3:
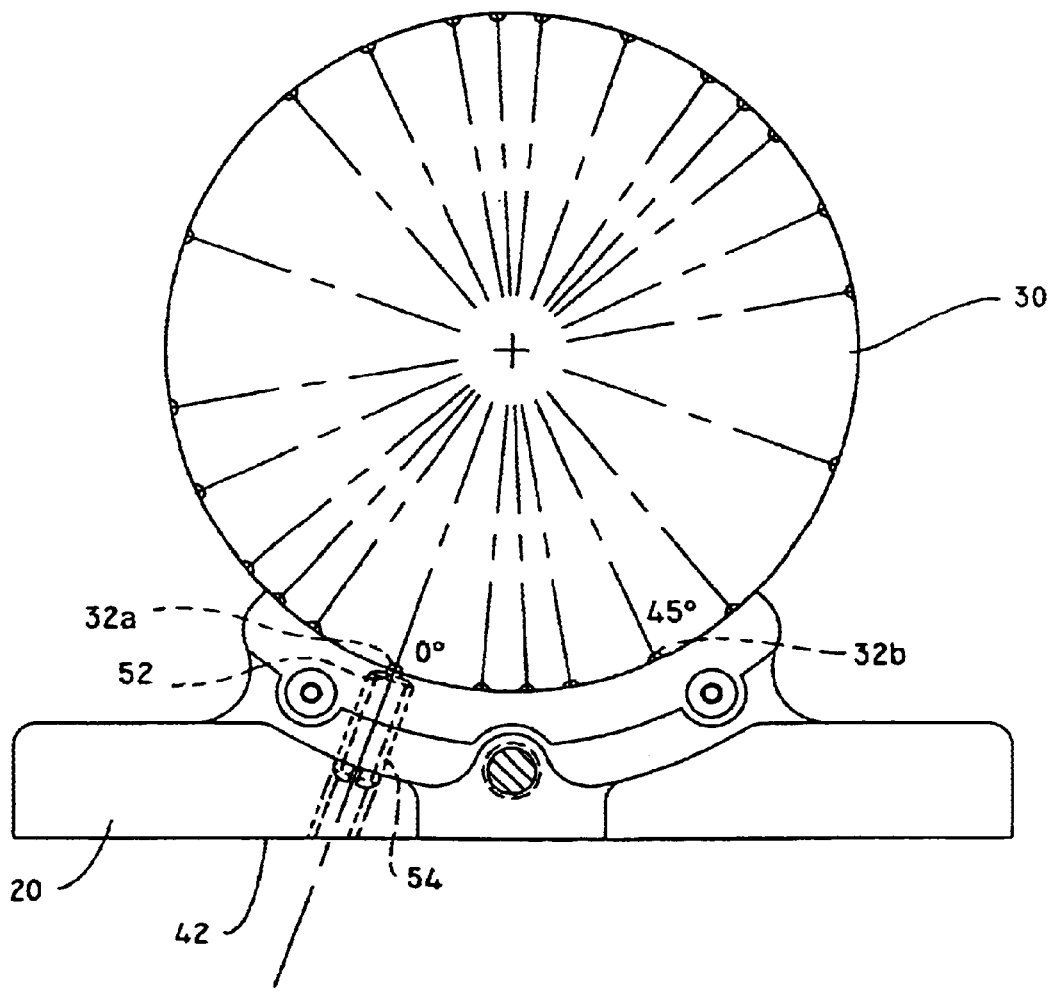
FIG. 3 is a top view of the miter gauge and fence mount of FIG. 1, showing the various detent locations about the periphery of the miter housing.

The following description should be read with reference to the drawings, in which like elements in different drawings are numbered in like fashion. The drawings, which are not necessarily to scale, depict selected embodiments and are not intended to limit the scope of the invention. Although examples of construction, dimensions, materials and manufacturing processes are illustrated for the various elements, those skilled in the art will recognize that many of the examples provided have suitable alternatives that may be utilized.

FIG. 1 is a partial exploded, perspective view of a miter gauge 10 in accordance with an exemplary embodiment of the present invention. Miter gauge 10 includes an adjustable guide bar 12, a miter housing 14 connected to the guide bar 12, and a fence mount 20. Guide bar 12 is configured to slide within an alignment track (not shown) disposed on a work surface such as a table saw or router table. A fence such as the expandable fence 66 described with respect to FIG. 8 can be mounted to the fence mount 20.

Miter housing 14 includes a disc assembly 18 operatively coupled to the fence mount 20 during use. Disk assembly 18 comprises a lower circular plate 28, an upper circular plate 30, and a slot 29 therebetween. A cam post 34 slidably disposed within slot 29 can be moved about the entire periphery of the disk assembly 18, allowing the fence mount 20 to rotate a full 360° about the miter housing 14. A handle 16 attached to the top surface of the upper circular plate 30 can be used to slide the miter gauge 10 along the alignment track during an operation.

In certain implementations, the lower circular plate 28 and upper circular plate 30 may include one or more guide bar mount apertures 40 for mounting the miter housing 14 to the guide bar assembly 12. A threaded fastener (not shown) may be inserted into the guide bar mount apertures 40 and secured to the guide bar 12.

Fence mount 20 includes a tab 48 configured in size and shape to slide within slot 29 of miter housing 14. To releasably secure the fence mount 20 to the miter housing 14, a cam post aperture 50 on fence mount 20 is configured to receive cam post 34 of miter housing 14. A cam pin 56 threadably connected to the fence mount 20 can be utilized to lock the fence mount 20 to the miter housing 14 once the desired miter angle has been set. As shown in FIG. 2, cam pin 56 may include a first end 57 having substantially conical shape, and a second end (not shown) having a handle 58 attached thereto.

Fence mount 20 further includes a fence mount face 42 that can be utilized to mount a fence or other guide member to the miter gauge 10. Several fence attachment bolts 44 extending through the fence mount 20 to the fence mount face 42 can be utilized to releasably secure the fence thereto. Each fence attachment bolt 44 may include a wing-nut 46 or other hands-free attachment means to permit quick removal of the fence from the fence mount 20, if desired. Several threaded apertures 54 may also be utilized to mount a dial to the fence mount 20.

In the exemplary embodiment illustrated in FIG. 1, upper circular plate 30 can include a plurality of detents 32 disposed at various positions along its perimeter. A spring loaded ball 52 disposed within the fence mount 20 can be configured to engage the detents 32 as the fence mount 20 is rotated about the miter housing 14. The spring loaded ball 52 is biased in an outward direction via a spring (not shown). As the spring loaded ball 52 engages each detent 32, a clicking sound informs the operator that the fence mount 20 is in position at a particular angle relative to the miter bar assembly 12.

As illustrated in FIG. 3, the detents 32 can be arranged at various pre-determined angles (e.g. 0°, 15°, 22.5°, 30°, 45°, 60°, etc.) about the upper circular plate 30. In the position shown in FIG. 3, the spring loaded ball 52 is engaged within a detent 32a labeled 0°. To adjust the miter angle to 45°, for example, the operator rotates the fence mount 20 in a counterclockwise direction until the spring loaded ball 52 engages the detent 32b labeled 45°. A screw 54 accessible from the fence mount face 42 can be utilized to adjust the bias of the spring loaded ball 52, if desired.

Figure 4:
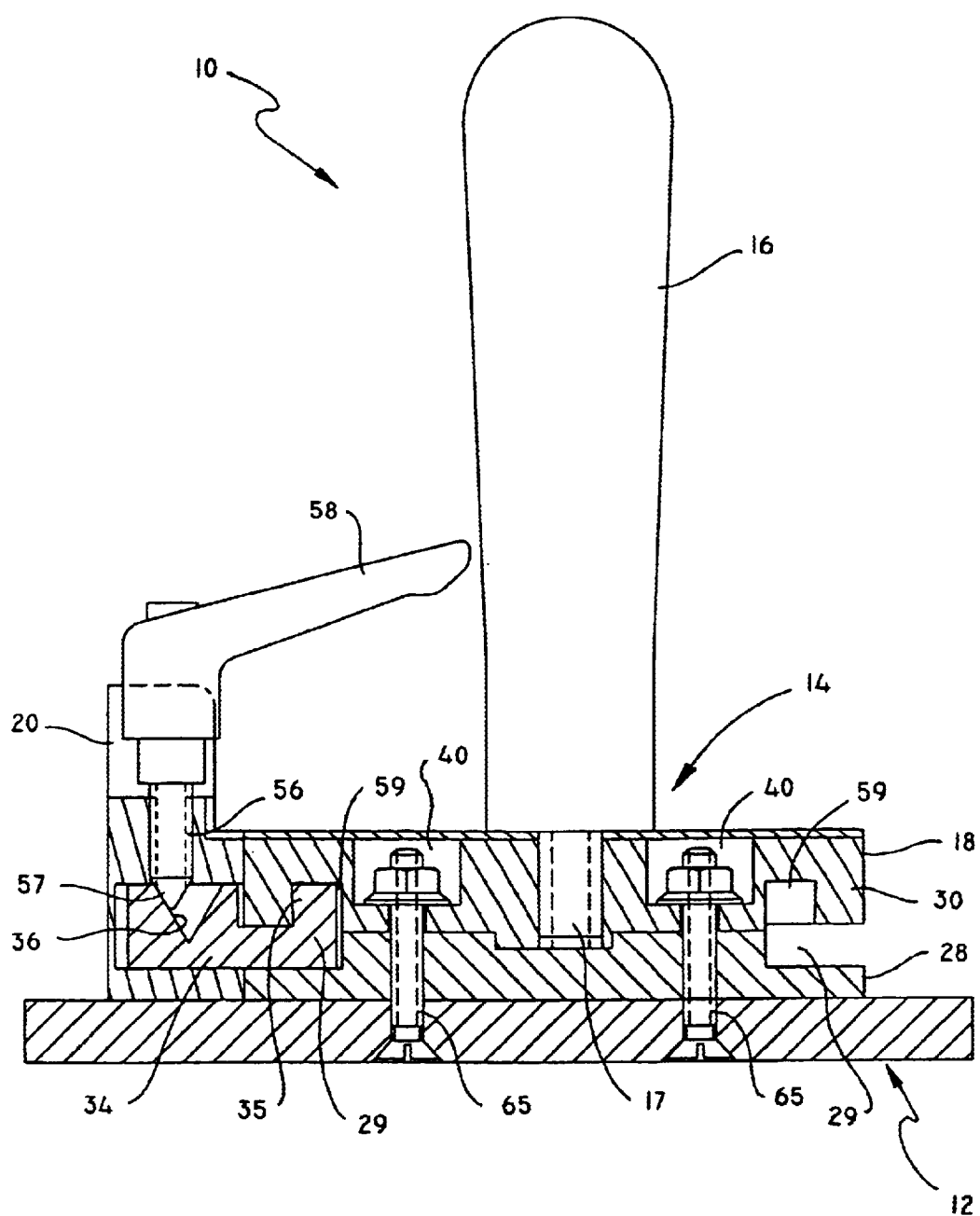
FIG. 4 is cross-sectional view of the miter gauge of FIG. 1, showing the connection of the miter housing and fence mount to the guide bar assembly.

FIG. 4 is a cross-sectional view of the miter gauge of FIG. 1 along line 4—4, showing the connection of the miter housing 14 to the guide bar 12, and showing the fence mount 20 engaged within the cam post 34. For ease of understanding, handle 16 of disk assembly 18 and handle 58 of cam pin 56 have not been shown in cross-section.

As can be seen in FIG. 4, the upper circular plate 30, lower circular plate 28 and guide bar 12 are connected together by several bolts 65. Handle 16, in turn, is connected to the miter housing 14 by a threaded fastener 17. Disposed within slot 29 of disc assembly 18 is cam post 34. Cam post 34 includes an upwardly extending flange 35 adapted to fit within slot 59 formed on the upper circular plate 30. Slot 59 is configured such that cam post 34 can slide within slot 29 when cam pin 56 is disengaged from the cam post aperture 36.

In the particular view illustrated in FIG. 4, handle 58 has been rotated such that the fence mount 20 is engaged with miter housing 14 and guide bar 12. The first end 57 of cam pin 56 is disposed at least in part within cam opening 36 of cam post 34. In this position, the fence mount 20 is releasably secured to the miter housing 14 and guide bar 12 such that fence mount face 42 is disposed perpendicular to the longitudinal axis of the guide bar 12. To subsequently disengage the fence mount 20 from the miter housing 14, handle 58 can be rotated until the first end 57 of cam pin 56 is no longer disposed within the cam opening 36 of cam post 34. Once disengaged, the operator can then rotate the fence mount 20 to another position.

Figure 5:
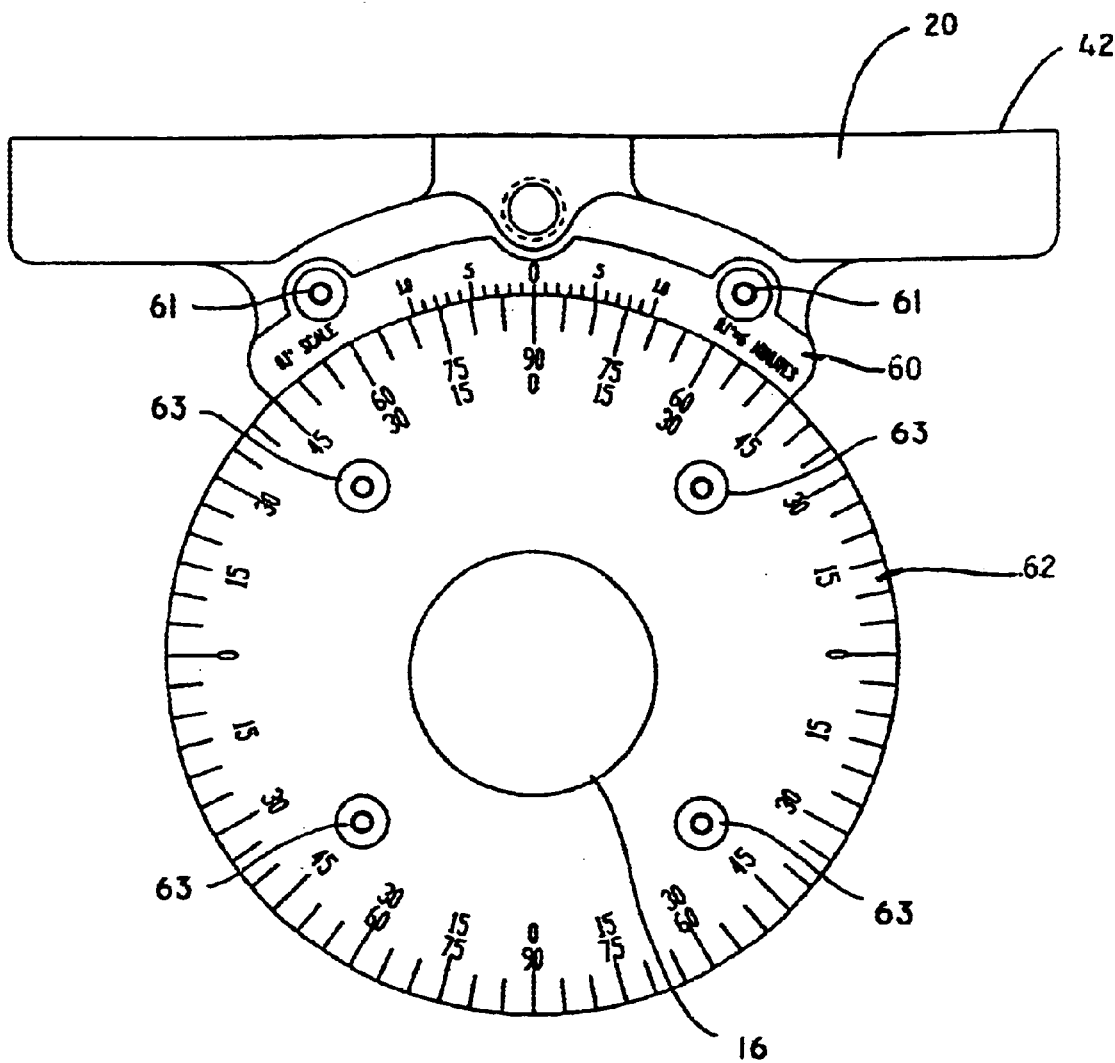
FIG. 5 is a top view of the miter housing and fence mount of FIG. 1, showing the vernier plates mounted to the miter housing and fence mount.

To facilitate accurate measurement of the miter angle, miter gauge 10 may further include a vernier scale. As shown in FIG. 5, for example, the vernier scale may comprise a first vernier plate 60 and a second vernier plate 62. The first vernier plate 60 is attached to the fence mount 20 by screws 61, and includes several markings to permit fine adjustment of the miter gauge 10. The second vernier plate 62 is attached to the upper circular plate 30 by screws 63. In use, the first vernier plate 60 and second vernier plate 62 can be used to obtain an accurate measure of the miter angle. It is to be understood that while the vernier scale illustrated in FIG. 5 has 0.1 degree angular increments (0.1 degree=6 min), other configurations are possible without deviating from the scope of the invention.

Referring back to FIG. 1, the guide bar 12 of miter gauge 10 will now be described. Guide bar 12 includes a U-shaped portion 22 and a T-shaped portion 24. The T-shaped portion is insertable in the U-shaped portion 22, and is configured to move relative to U-shaped portion 22 to adjust the width of the guide bar 12 within the alignment track.

Figure 6:
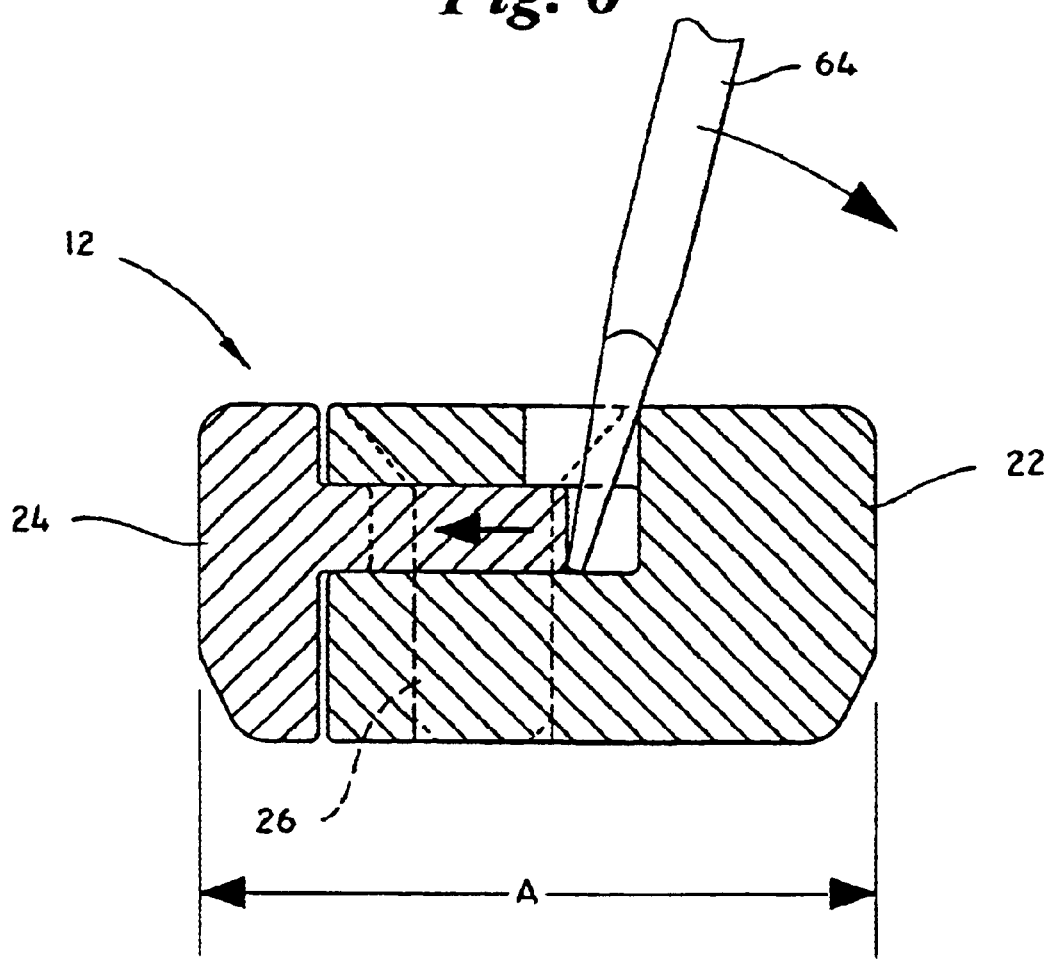
FIG. 6 is a cross-sectional view of the guide bar assembly of FIG. 1.

FIG. 6 is cross-sectional view of the miter bar 12 of FIG. 1 along line 6—6. In FIG. 6, a screwdriver 64 is shown spreading U-shaped portion 22 and T-shaped portion 24 to increase width A. Once width A is adjusted to a desired distance, a set-screw 26 or other fastening device can be used to releasably secure the T-shaped portion 24 to the U-shaped portion 22.

Figure 7:
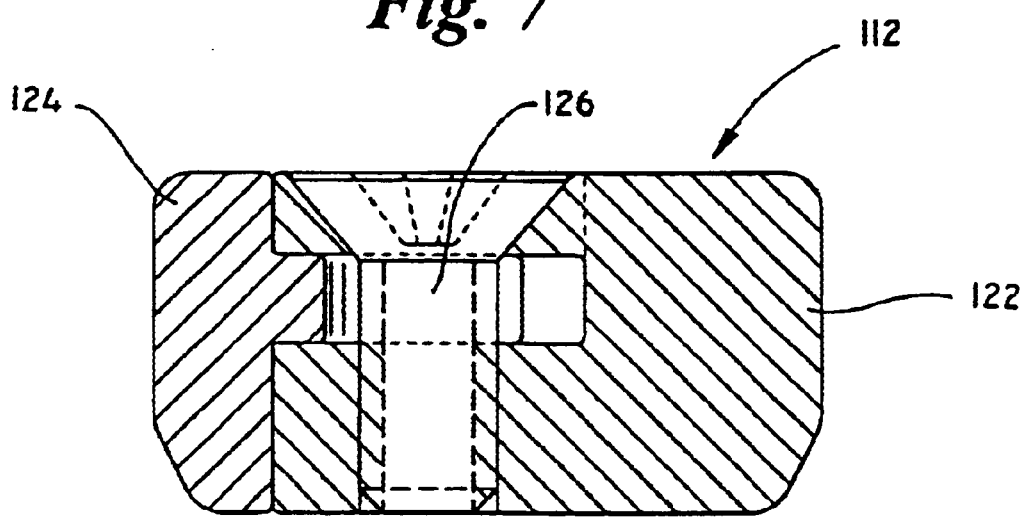
FIG. 7 is a cross-sectional view of another guide bar assembly in accordance with an alternative embodiment of the present invention.

In an alternative embodiment illustrated in FIG. 7, a pin or threaded fastener 126 can be used to lock the U-shaped portion 122 to the T-shaped portion 124. The pin or threaded fastener 126 can be inserted through an opening disposed on the T-shaped portion 124, thereby locking the two portions 122, 124 together.

Figures 8, 8A:
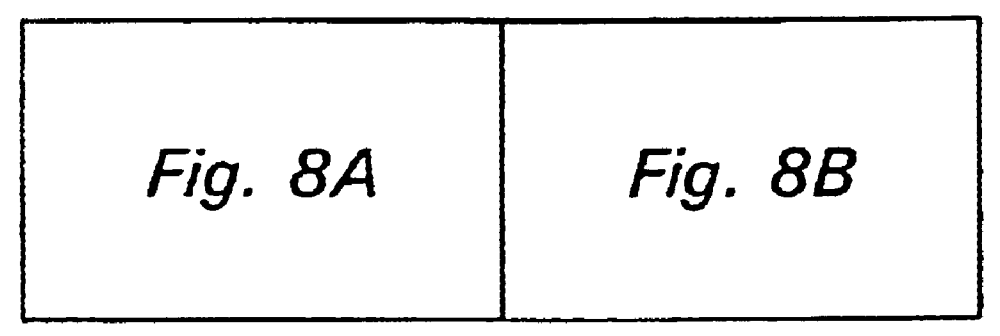
Figure 8B:
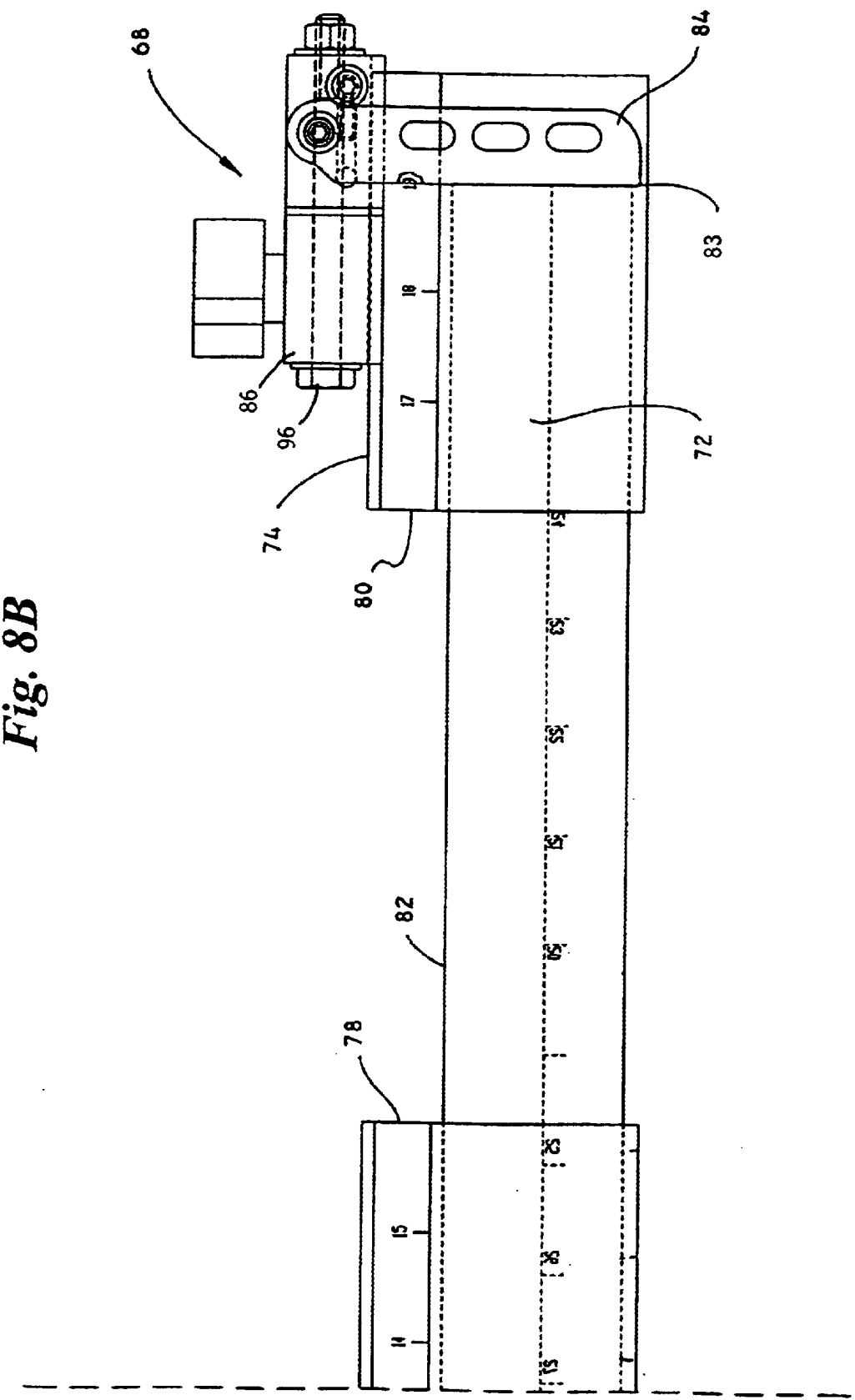
FIG. 8 is a front view of an expandable fence in accordance with an exemplary embodiment of the present invention.

FIG. 8 is a front view of an exemplary embodiment of a fence 66 in accordance with the present invention. Fence 66 includes a main fence section 70, a fence extender 82, and a carriage 74 configured to slide about the fence extender 82. Main fence section 70 and carriage 74 each have a longitudinal inner lumen 71, 72 extending therethrough configured to receive the fence extender 82. The back of main fence section 70 (not shown) includes several openings configured to receive the fence attachment bolts 44 of fence mount 20.

Fence extender 82 is slidably disposed within the inner lumens 71, 72 of main fence section 70 and carriage 74. A belt (not shown) operatively coupled to the fence extender 82 permits adjustment of the fence length to accommodate various sized workpieces. In the particular view illustrated in FIG. 8, carriage 74 is shown extended a distance from the main fence section 70 such that a portion of the fence extender 82 is extending at least in part from inner lumen 71.

Fence 66 may further include a linear scale disposed along the main fence segment 70, fence extender 82 and carriage 74. The main fence segment 70 of fence 66 may include an upper scale extending from 0 inches at location 76 to 16 inches at location 78. The carriage 74, in turn, may include upper scale extending from 16 inches at location 80 to 19 inches at location 83.

In use, fence extender 82 can be positioned such that location 78 of main fence segment 70 is aligned with location 80 of carriage 74. In this position, the upper scale can be read from "0" at location 72 to "19" at location 83, indicating an overall length of 19 inches. A flip stop mechanism 68 having a vertical stop face 84 slidably is disposed on carriage 74 such that the vertical stop face 84 is aligned with location 83. The flip stop mechanism 68 can be used to prevent movement of the workpiece in a direction substantially parallel to the length of the fence 66.

For workpieces having a length greater than 19 inches, carriage 74 can be moved to the right along fence extender 82, exposing several additional scale markings on a bottom scale. While holding fence extender 82 in position within main fence segment 70, carriage 74 can be moved to the right along fence extender 82 until location 80 on carriage 74 is aligned with the "20" inch mark located on the bottom scale of the fence extender 82, indicating a total distance from location 76 to location 83 of 20 inches. The carriage 74 can be further advanced relative to the main fence segment 70 and fence extender 82 until the "24" inch mark on the fence extender 82 is aligned with location 80 on carriage 74, indicating a total length of 24 inches from location 76 on main fence segment 70 to location 83 on carriage 74.

To further extend fence 66 to measure even longer workpieces, the fence extender 82 can be slid to the right from within the inner lumen 71 of main fence segment 70. When fence extender 82 is moved to the right one inch, the "25" inch mark on the lower scale of fence extender 82 will align with location 80 on the carriage 74, indicating a total length of 25 inches. Continued movement of the fence extender 82 to the right exposes additional inch mark indicators (e.g. "26", "27", "28") on the bottom scale of fence extender 82 which can be read to obtain a measure of the length of the workpiece.

Although the various scales shown herein indicate inches as the unit of measure, it is to be understood that other units of measure (e.g. SI) can be used. Moreover, it should be appreciated that different lengths of the various members of fence 66 can also be employed.

Figure 9:
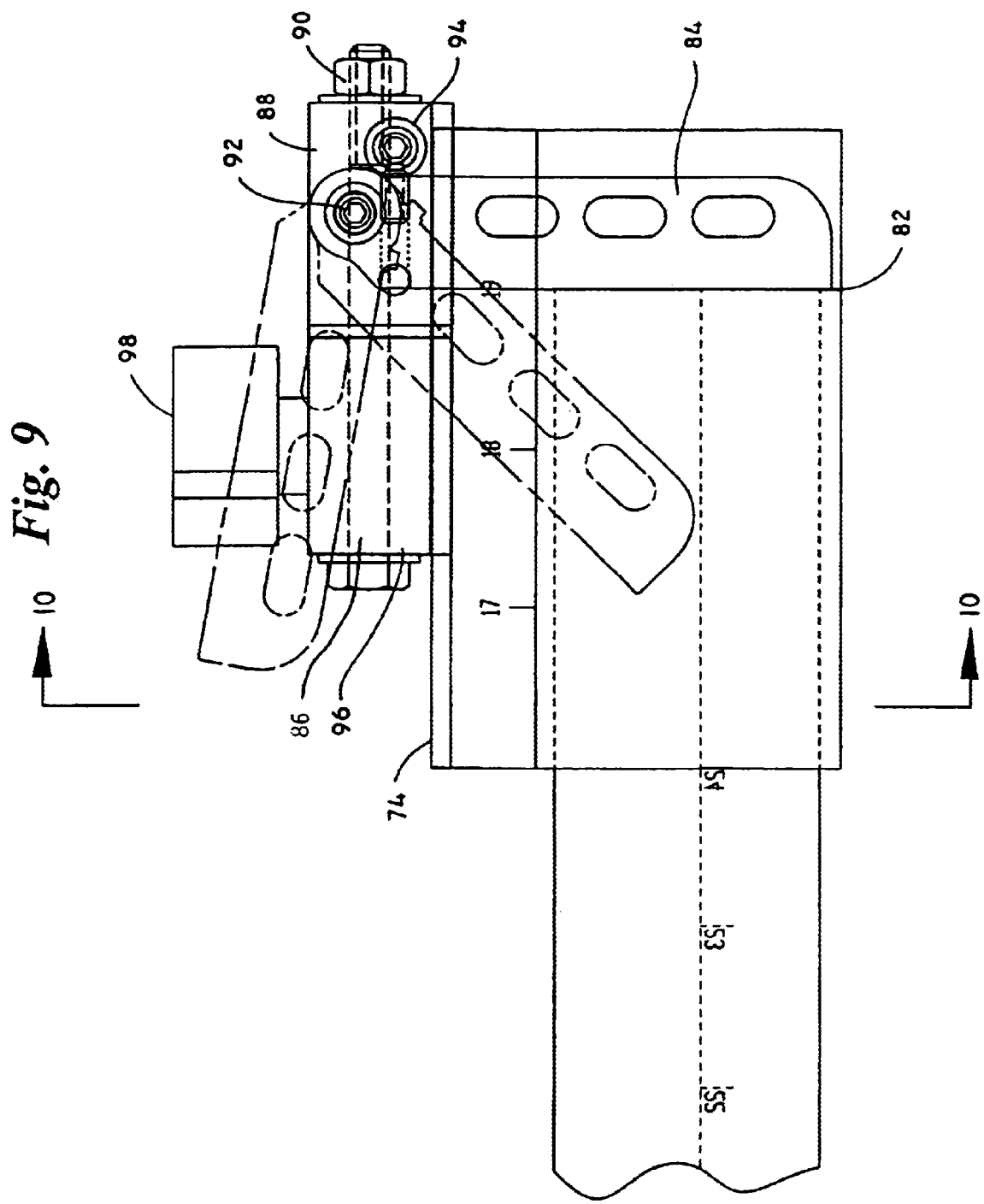
FIG. 9 is an exploded view of the flip stop mechanism of FIG. 8, showing the rotation of the vertical stop face about a first axis of rotation.

FIG. 9 is an exploded view of the flip stop mechanism 68 illustrated in FIG. 8. Flip stop mechanism 68 comprises a mount portion 86 that releasably secured to the top portion of carriage 74, and a rotatable portion 88 that can be rotated about an axis substantially parallel to the length of the fence 66. Flip stop mechanism 68 can be slidably connected to the carriage 74 and main fence section 70. A bolt 90 extending through the mount portion 86 and rotatable portion 88 connects the two portions 86, 88 together.

Vertical stop face 84 is connected to the rotatable portion 88 via a first bolt 92, and is configured to rotate upwardly about an axis substantially perpendicular to the length of fence 66. Vertical stop face 84 is configured to permit the workpiece to pass the flip stop mechanism 68 in only one direction. To load the workpiece into the fence 66, the workpiece is advanced from right to left, forcing the vertical stop face 8 to rotate upwardly as indicated by the dashed lines. Once the workpiece has been loaded, the vertical stop face 84 rotates back to its initial position. A second bolt 94 on rotatable portion 88 prevents the vertical stop face 84 from over-rotating to the right beyond location 83.

Figure 10:
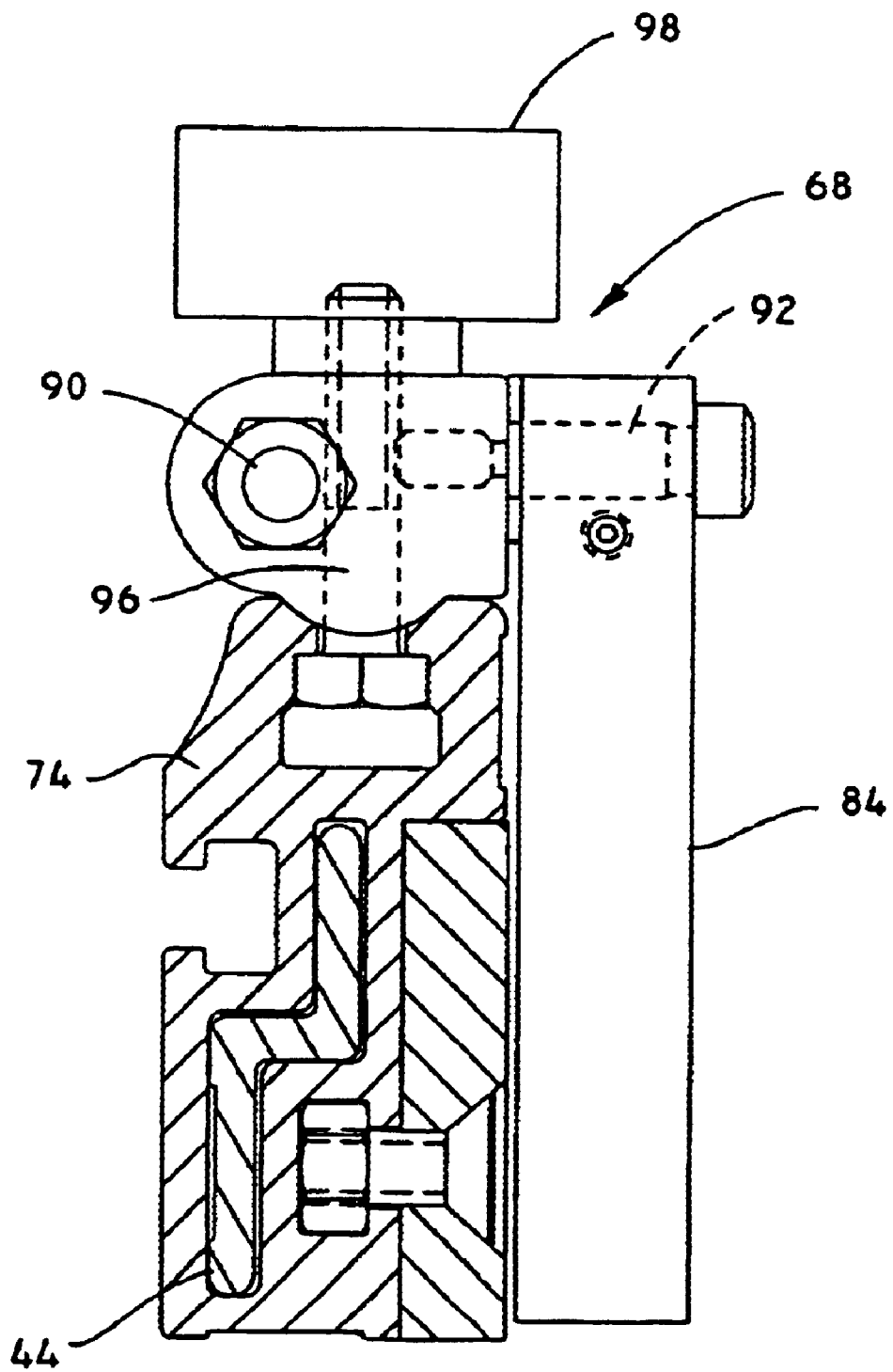
FIG. 10 is a cross-sectional view of the flip stop mechanism of FIG. 9 along line 10—10.
Figure 11:
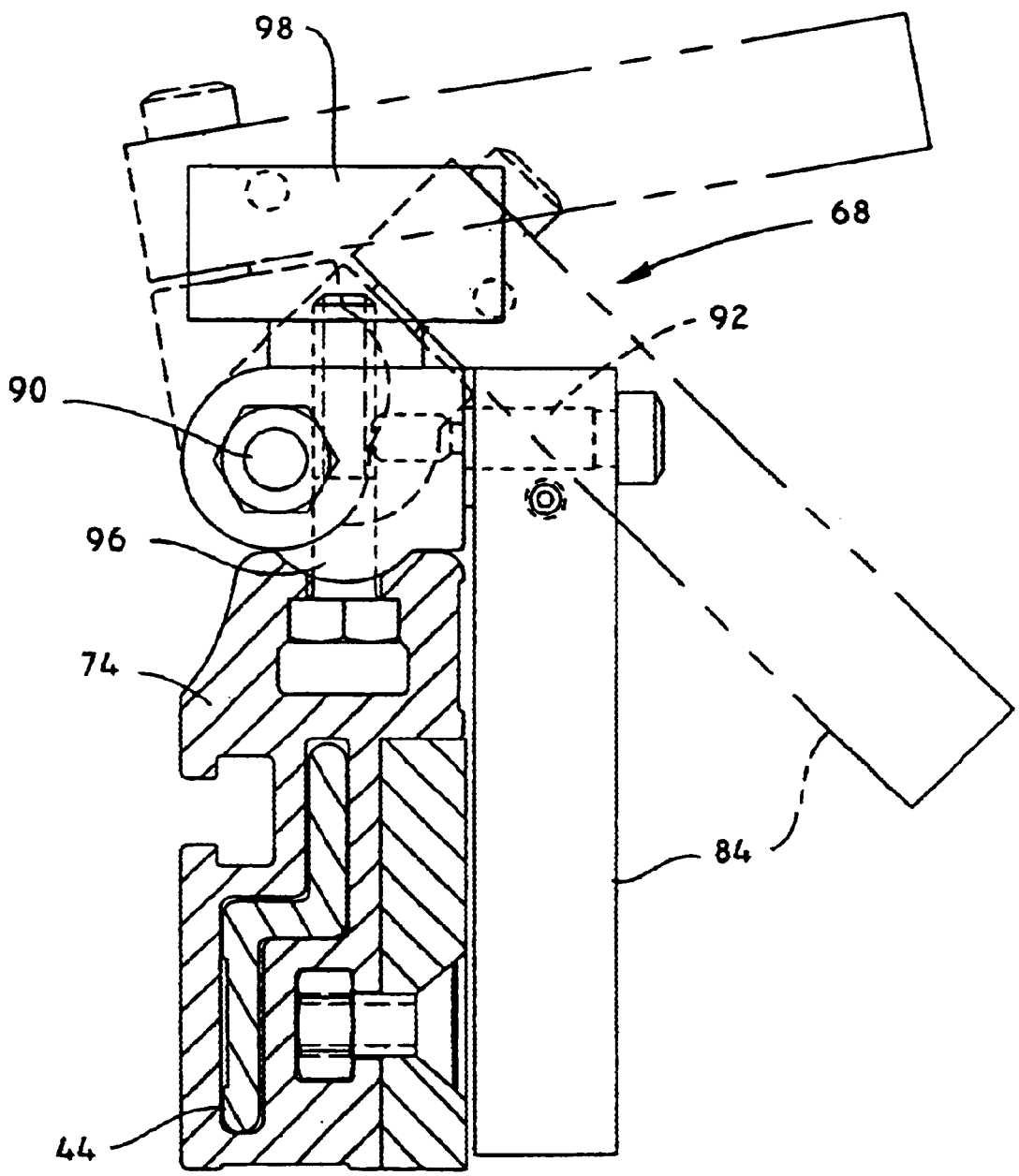
FIG. 11 is another cross-sectional view of the flip stop mechanism of FIG. 9, showing the rotation of the vertical stop face about a second axis of rotation.

FIG. 10 is a cross-sectional view of the fence of FIG. 8 along line 10—10. As shown in FIG. 10, flip stop mechanism 68 may be mounted to carriage 74 via fastener 96. A knob 98 attached to fastener 96 can be rotated to secure the flip stop mechanism 68 at various locations along the top of the carriage 74. As indicated by dashed lines in FIG. 11, the rotatable portion 88 of flip stop mechanism 68 can be rotated about an axis substantially parallel to the length of the fence 66, allowing the operator to temporarily relocate the vertical stop face 94 above the fence 66. In this position, the operator can advance or remove workpieces from the fence 66 without engaging the flip stop mechanism 68.

Having thus described the several embodiments of the present invention, those of skill in the art will readily appreciate that other embodiments may be made and used which fall within the scope of the claims attached hereto. Numerous advantages of the invention covered by this document have been set forth in the foregoing description. It will be understood that this disclosure is, in many respects, only illustrative. Changes may be made in details, particularly in matters of shape, size and arrangement of parts without exceeding the scope of the invention.

What is claimed is:

1. A miter gauge for positioning a workpiece on a work surface having an alignment track, said miter gauge comprising:
   a guide bar slidably disposed within the alignment track, said guide bar including adjustment means to adjust the width of the guide bar;
   a miter housing including a disc assembly having a lower circular plate, an upper circular plate, and a slot therebetween;
   a cam post slidably disposed within the slot;
   a fence mount having a cam post aperture for receiving the cam post; and
   a fence.

2. The miter gauge of claim 1, wherein said work surface is a table saw.

3. The miter gauge of claim 1, wherein said work surface is a router table.

4. The miter gauge of claim 1, wherein said guide bar comprises a U-shaped track and a T-shaped track.

5. The miter gauge of claim 4, further comprising a threaded fastener to releasably secure the T-shaped portion to the U-shaped portion.

6. The miter gauge of claim 1, wherein said fence mount is configured to rotate about the entire periphery of said disc assembly.

7. The miter gauge of claim 1, wherein said upper circular plate includes a plurality of detents disposed about its periphery, and wherein said fence mount includes a spring loaded ball for engagement within said detents.

8. The miter gauge of claim 1, further comprising a vernier scale configured to adjust the angle of the fence mount relative to the miter housing.

9. The miter gauge of claim 8, wherein said vernier scale comprises a first vernier plate disposed on the fence mount, and a second vernier plate disposed on the miter housing.

10. The miter gauge of claim 1, wherein said fence mount includes a cam pin engageable within said cam post.

11. The miter gauge of claim 10, wherein said cam pin includes a first end having a substantially conical shape, and a second end having a handle attached thereto.

12. The miter gauge of claim 11, wherein rotation of said handle drives the cam pin into an opening on said cam post to releasably secure the fence mount to the miter housing.

13. The miter gauge of claim 1, wherein said fence is an extendable fence.

14. The miter gauge of claim 13, wherein said extendable fence includes a main fence segment, a carriage, and a fence extender.

15. The miter gauge of claim 14, wherein the fence extender is slidably disposed within a longitudinal lumen extending through the main fence segment.

16. The miter gauge of claim 1, further comprising a flip stop mechanism.

17. The miter gauge of claim 16, wherein said flip stop mechanism includes a mount portion, a rotatable portion, and a vertical stop face connected to the rotatable portion.

18. The miter gauge of claim 16, wherein the vertical stop face of said flip stop mechanism is rotatable about an axis substantially parallel to the longitudinal axis of the fence.

19. The miter gauge of claim 16, wherein the vertical stop face of said flip stop mechanism is rotatable about an axis substantially perpendicular to the longitudinal axis of the fence.

20. The miter gauge of claim 1, wherein said fence includes a linear scale.

21. A miter gauge for positioning a workpiece on a work surface having an alignment track, said miter gauge comprising:
- a guide bar slidably disposed within the alignment track, said guide bar including adjustment means to adjust the width of the guide bar;
- a miter housing including a disc assembly having a lower circular plate, an upper circular plate, and a slot therebetween;
- a cam post slidably disposed within the slot;
- a fence mount configured to rotate about the entire periphery of said disc assembly, said fence mount having a cam post aperture for receiving the cam post; and
- an extendable fence having a main fence segment, a carriage, and a fence extender.

22. The miter gauge of claim 21, wherein said upper circular plate includes a plurality of detents disposed about its periphery, and wherein said fence mount includes a spring loaded ball for engagement within said detents.

23. The miter gauge of claim 21, further comprising a vernier scale configured to adjust the angle of the fence mount relative to the miter housing.

24. The miter gauge of claim 23, wherein said vernier scale comprises a first vernier plate disposed on the fence mount, and a second vernier plate disposed on the miter housing.

25. The miter gauge of claim 21, wherein said fence mount includes a cam pin engageable within said cam post.

26. The miter gauge of claim 25, wherein said cam pin includes a first end having a substantially conical shape, and a second end having a handle attached thereto.

27. The miter gauge of claim 26, wherein rotation of said handle drives the cam pin into an opening on said cam post to releasably secure the fence mount to the miter housing.

28. The miter gauge of claim 21, further comprising a flip stop mechanism.

29. The miter gauge of claim 28, wherein said flip stop mechanism includes a mount portion, a rotatable portion, and a vertical stop face connected to the rotatable portion.

30. The miter gauge of claim 28, wherein the vertical stop face of said flip stop mechanism is rotatable about an axis substantially parallel to the longitudinal axis of the fence.

31. The miter gauge of claim 28, wherein the vertical stop face of said flip stop mechanism is rotatable about an axis substantially perpendicular to the longitudinal axis of the fence.

32. The miter gauge of claim 21, wherein said fence includes a linear scale.

33. A miter gauge for positioning a workpiece on a work surface having an alignment track, said miter gauge comprising:
- a guide bar slidably disposed within the alignment track, said guide bar including U-shaped track and a T-shaped track;
- a miter housing including a disc assembly having a lower circular plate, an upper circular plate, and a slot therebetween;
- a cam post slidably disposed within the slot;
- a fence mount configured to rotate about the entire periphery of said disc assembly, said fence mount having a cam post aperture for receiving the cam post; and
- an extendable fence having a main fence segment, a carriage, and a fence extender.

34. A miter gauge for positioning a workpiece on a work surface having an alignment track, said miter gauge comprising:
- a guide bar slidably disposed within the alignment track, said guide bar including U-shaped track and a T-shaped track;
- a miter housing including a disc assembly having a lower circular plate, an upper circular plate, and a slot therebetween;
- a cam post slidably disposed within the slot;
- a fence mount configured to rotate about the entire periphery of said disc assembly, said fence mount having a cam post aperture for receiving the cam post;
- a fence; and
- a flip stop mechanism.

* * * * *